United States Patent
Jovicic et al.

(10) Patent No.: US 8,811,957 B2
(45) Date of Patent: Aug. 19, 2014

(54) ADVERTISING METHODS AND APPARATUS FOR USE IN A WIRELESS COMMUNICATIONS SYSTEM

(75) Inventors: Aleksandar Jovicic, Jersey City, NJ (US); Cyril Measson, Somerville, NJ (US); Thomas Richardson, South Orange, NJ (US); Junyi Li, Chester, NJ (US); Vincent D. Park, Budd Lake, NJ (US); Mathew Scott Corson, Gillette, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 57 days.

(21) Appl. No.: 12/875,333

(22) Filed: Sep. 3, 2010

(65) Prior Publication Data
US 2012/0058745 A1    Mar. 8, 2012

(51) Int. Cl.
| | |
|---|---|
| H04M 3/42 | (2006.01) |
| H04L 29/08 | (2006.01) |
| G06Q 30/02 | (2012.01) |
| G06Q 50/34 | (2012.01) |
| H04M 3/487 | (2006.01) |
| H04W 84/18 | (2009.01) |

(52) U.S. Cl.
CPC ............ *G06Q 30/02* (2013.01); *H04M 3/4878* (2013.01); *H04M 2207/18* (2013.01); *H04W 84/18* (2013.01); *H04L 67/32* (2013.01); *H04L 67/20* (2013.01); *H04L 67/02* (2013.01); *G06Q 50/34* (2013.01)
USPC ................. 455/414.1; 455/466; 455/412.1; 370/331; 370/310

(58) Field of Classification Search
USPC ........ 455/466, 517, 343.2, 566, 414.4, 414.1, 455/412.1; 370/331, 310, 390, 311, 401, 370/338, 389; 705/26.1, 14.64; 709/217, 709/201, 206, 227
See application file for complete search history.

(56) References Cited

U.S. PATENT DOCUMENTS

| | | | |
|---|---|---|---|
| 6,381,465 B1 * | 4/2002 | Chern et al. | ........... 455/466 |
| 6,507,764 B1 | 1/2003 | Parrella et al. | |

(Continued)

FOREIGN PATENT DOCUMENTS

| | | |
|---|---|---|
| JP | 2005107292 A | 4/2005 |
| JP | 2005164995 A | 6/2005 |

OTHER PUBLICATIONS

Györö Gidófalvi, et al., "Estimating the capacity of the Location-Based Advertising channel", IJMC 6(3): pp. 357-375 (2008).

(Continued)

*Primary Examiner* — Mahendra Patel
(74) *Attorney, Agent, or Firm* — James K. O'Hare

(57) ABSTRACT

Methods and apparatus related to communicating advertisements and/or service announcements to devices in a communications system are described. In various embodiments mobile devices are used as mobile advertisement transmission platforms. Advertisements may be downloaded to the wireless communications device along with transmission constraints. Transmission of an advertisement is made when a transmission constraint, e.g., target audience constraint is satisfied. The wireless terminal may change its transmission frequency, coding rate and/or other transmission characteristics to satisfy a transmission constraint and/or optimize revenue. The mobile device reports advertisements transmissions to a network device, e.g., advertisement server and the owner of the device is compensated for the transmissions. Transmission constraints may involve a number of devices to be reached, the type of devices to be reached, and/or other constraints relating to the demographics of device users. Information may be obtained from peer discovery signals and used to determine if a constraint is satisfied.

20 Claims, 5 Drawing Sheets

(56) References Cited

U.S. PATENT DOCUMENTS

| | | | |
|---|---|---|---|
| 6,898,517 B1* | 5/2005 | Froeberg | 701/468 |
| 7,343,317 B2 | 3/2008 | Jokinen et al. | |
| 2001/0047294 A1* | 11/2001 | Rothschild | 705/14 |
| 2002/0032035 A1* | 3/2002 | Teshima | 455/456 |
| 2004/0015608 A1* | 1/2004 | Ellis et al. | 709/246 |
| 2004/0054576 A1* | 3/2004 | Kanerva et al. | 705/14 |
| 2007/0220575 A1 | 9/2007 | Cooper et al. | |
| 2008/0160956 A1 | 7/2008 | Jackson et al. | |
| 2009/0044246 A1 | 2/2009 | Sheehan et al. | |
| 2009/0248478 A1* | 10/2009 | Duggal et al. | 705/8 |
| 2011/0153773 A1* | 6/2011 | Vandwalle et al. | 709/217 |

OTHER PUBLICATIONS

International Search Report and Written Opinion—PCT/US2011/050408—ISA/EPO—Jan. 4, 2013.

* cited by examiner

ADVERTISING METHODS AND APPARATUS FOR USE IN A WIRELESS COMMUNICATIONS SYSTEM

FIELD

Various embodiments relate to wireless communications, and more particularly, to methods and apparatus for communicating advertisements and/or customer service messages in a communications system.

BACKGROUND

Broadcasters, including wireless broadcasters, often charge for advertisements based on the amount of potential customers that can be reached and/or the demographics of the audience that can be reached. In addition, broadcasters normally charge on a per advertisement basis. Advertisers are often willing to pay more to reach a targeted audience, e.g., an audience satisfying one or more constraints.

In traditional advertising systems such as television and radio there is normally not a tradeoff in terms of the number of advertisements which can be served in a given time period versus the number of users and/or specific audience that can be reached. This is because for such fixed broadcasters, transmission power and/or other transmission constraints such as frequency remain fixed regardless of what is being transmitted.

While radio stations and fixed broadcast sites often generate revenue by transmitting advertisements, it would be desirable if mobile devices, e.g., wireless terminals in an ad-hoc or other type of network, could also generate revenue by transmitting advertisements and charging for such broadcasts. Unfortunately, mobile devices are normally subject to power constraints as a result of being battery powered and/or to limit interference to other devices in the system. The power limitations associated with mobile wireless terminals means that their transmission range tends to be smaller than that of radio or base stations which tend to be powered via fixed power transmission lines. While power constraints tend to limit the range of mobile devices and/or the duration of transmissions, mobile devices are often carried by individuals and end up in locations frequented by other people. As a mobile device comes into proximity with other wireless devices, it may be presented with numerous opportunities to communicate advertisements to a wide variety of other mobile devices users and/or people with a wide range of interests.

Thus, while mobile devices have various drawbacks for use as advertising transmission platforms, they also offer advertising opportunities that might differ from those available through the use of fixed site transmitters such as radio and TV stations.

In view of the above discussion is should be appreciated that there is a need for methods and/or apparatus which would allow mobile devices to be used as advertising platforms. In order to optimize the value of using a mobile device as an advertising platform it would be desirable if an advertiser could specify advertising constraints that the mobile device would have to satisfy, e.g., as part of an advertising service. It would also be desirable if a mobile device could, in some but not necessarily all embodiments control advertising transmission in a manner that was intended to optimize revenue and/or compensation generated from the transmission of advertisements from the mobile device.

SUMMARY

Methods and apparatus related to communicating advertisements and/or service announcements to devices in a communications system are described. In various embodiments mobile devices are used as mobile transmission platforms. A mobile wireless communications device maybe, for example, a telephone, PDA, mobile computer with wireless capability, etc. The mobile wireless communications devices may, and in some embodiments do, support peer to peer signaling. Via peer to peer signaling or another wireless communications protocol advertisements and/or service announcements such as public alerts may be transmitted, e.g., directly from the mobile device transmitting an advertisement, to one or more other devices.

Advertisements may be downloaded to the wireless communications device along with transmission constraints. This may be done via a wireless link with the mobile communications device when the mobile communications device is in a condition where there is good transmission quality with respect to an access point, e.g., base station, through which the advertisements to be broadcast can be downloaded to the mobile wireless device. Since the advertisements can be loaded in the mobile device when wireless communications link quality is good, the effect of downloading the advertisement on the device's performance and on the device's ability to perform other communications activities can be minimized. Furthermore, while the mobile communications device can transmit advertisements at any time, it need not be in constant contact with a source of advertisements such as an advertising server.

In various embodiments the mobile communications device store, e.g., in a memory device internal to the mobile communications device, advertisements and one or more corresponding transmission constraints, e.g., target audience and/or location constraints to be satisfied for an advertisement to be transmitted. By allowing an advertiser to specify various transmission constraints, an advertiser can have some reasonable certainty that the advertisement corresponding to a constraint will be broadcast to its intended target audience.

In some but not necessarily all embodiments, the mobile communications device acts to optimize the compensation, e.g., revenue, earned by transmitting advertisements. Thus, during periods of time when the transmission constraints of multiple advertisements are satisfied, the mobile device may, and in some embodiments does, select for transmission those advertisements which will maximize the amount of compensation earned by the mobile communications device for transmitting advertisements.

In order to maximize advertising revenue, a mobile wireless communications device may also modify one or more transmission characteristics, e.g., transmission power level, which of a plurality of directional antennas are used for a particular transmission, the frequency used for a particular transmission, etc. to maximize the compensation earned for transmitting advertisements. The changes in transmission characteristics may affect the transmission range and thus the number of devices which can be reached. The selection of a particular frequency for an advertisement transmission may be used to reach a particular set of target devices. For example, one set or brand of phones may use a particular frequency for communication while another set or brand of phones might use another frequency while computers/PDAs might use another frequency. By selecting the transmission frequency to be used for an advertisement, the mobile device can direct the advertisement to users of a particular brand device and/or type of device.

In the case of wireless communications devices where total transmission power is constrained there is a tradeoff between the transmission coverage area, and thus the potential number of customers that can be reached and the number of advertisements that can be delivered in a given period of time. This is because the broadcaster is often confronted with the choice of using a low coding rate, e.g., with greater coding redundancy, which can reach a larger transmission coverage area vs using a higher coding rate, e.g., with a lower level of coding redundancy, which is able to reach a smaller transmission area reliably.

While use of a lower coding rate has the potential to reach more customers because a larger coverage area can be reached using a given transmission power level, using a higher coding rate has the advantage of allowing more advertisements to be transmitted in a given period of time but at the expense of the number of potential customers which can be reached.

In some embodiments, the mobile wireless communications device takes into consideration the dynamics, which are often changing, with regard to the number of users/devices, e.g., in total or of a specific type which is of interest, in an area at a given time and selecting a combination of coding rate and number of advertisements that would produce the optimal advertising revenue from the perspective of an operator of the mobile device used to transmit advertisements. Thus, in some embodiments one or more transmission parameters are changed to satisfy an advertising transmission constraint and/ or to optimize the compensation, e.g., revenue, obtained from mobile device transmissions of advertisements.

An exemplary method of operating a mobile communications device, in accordance with some embodiments, comprises: storing a plurality of advertisements and corresponding target audience constraints; receiving a signal from at least one other device; determining if a target audience constraint is satisfied; and transmitting, when a target audience constraint corresponding to a stored advertisement is satisfied, an advertisement corresponding to the satisfied target audience constraint.

An exemplary mobile communications device, in accordance with some embodiments, comprises: at least one processor configured to: store a plurality of advertisements and corresponding target audience constraints; receive a signal from at least one other device; determine if a target audience constraint is satisfied; and transmit, when a target audience constraint corresponding to a stored advertisement is satisfied, an advertisement corresponding to the satisfied target audience constraint. The exemplary first peer to peer device further comprises memory coupled to said at least one processor.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
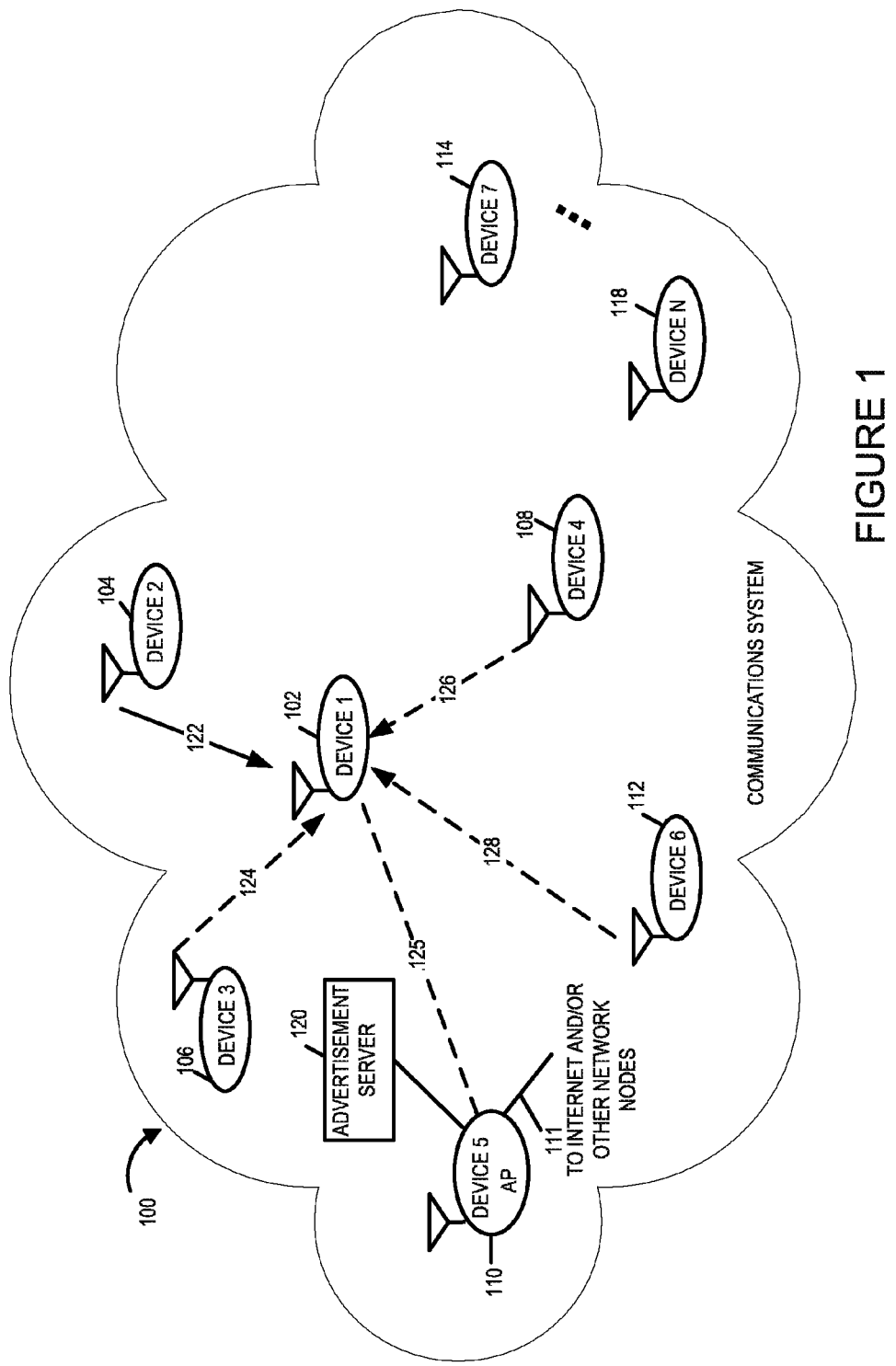
FIG. 1 is a drawing of an exemplary wireless communications system in accordance with an exemplary embodiment.

FIG. 1 is a drawing of an exemplary wireless communication system 100 in accordance with an exemplary embodiment. Exemplary wireless communications system 100 includes a plurality of wireless communications devices including device 1 102, device 2 104, device 3 106, device 4 108, device 5 110, device 6 112, device 7 114, . . . , device N 118. Some of the wireless communications devices in system 100, e.g., device 5 110, may be fixed location devices such as, e.g., an access router, e.g., base station operating as an access point (AP), including a wireless interface and a wired interface providing coupling to a backhaul network. The AP 110 may have a wireless link 125 with mobile device 1 102. Exemplary communications device 5 110 provides access to the Internet and/or other network nodes such as advertisement server 120. The backhaul may be implemented via a wired or fiber network connection 111. Device 5 110 which acts as an AP may provide connectivity to the Internet and/or other network nodes such as advertisement server 120. Thus via AP 110, advertisements, advertising constraints, advertisement bid information/compensation for a broadcast advertisement maybe communicated to one or more wireless devices via wireless communications links. Various wireless communications devices in system 100, e.g., device 1 102, device 2 104, device 3 106, device 4 108, device 6 112, device 7 114, and device N 118, are mobile wireless devices, e.g., handheld mobile devices, which can download, store and broadcast advertisements when one or more advertising constraints are satisfied. The mobile wireless devices may report advertisement broadcast information back to the advertising server 120 via AP 110 in order to receive compensation, e.g., monetary credit and/or access to one or more services as compensation for the transmitted advertisements.

One or more communications devices in system 100, may transmit and receive signals, e.g., peer discovery signals, paging signals and/or traffic data signals to one or more of other communications devices in the communications system 100. Thus mobile devices and the access point 110 can detect the presence of other communications devices in their vicinity. The particular type or brand of a mobile device may, and in some embodiments is, indicated by the broadcast peer discovery signals.

For the purpose of illustration and as an example, in FIG. 1, mobile communications device 1 102 receives a signal from at least one other device, e.g., signal 122, e.g., a peer discovery signal from device 2 104. Device 1 102 may receive one or more signals from other devices as indicted by dashed arrows 124, 126 and 128. In accordance with the one aspect, mobile communications device 1 102 is operated to communicate stored advertisements and/or customer service related information to one or more communications devices in the system 100, e.g., when a target audience constraint corresponding to an advertisement is satisfied. The determination regarding whether or not the target audience constraint is satisfied is made based on one or more received signals from at least one other device. In some embodiments if the target audience constraint is not satisfied, mobile communications device 1 102 refrains from transmitting a stored advertisement corresponding to the unsatisfied target audience constraint.

The advertising server 120 maintains a database including a plurality of advertisements and/or other messages, e.g., public service announcements, from a plurality of different advertisers and/or message sources. One or more target audience constraints may, and often are, stored in association with a corresponding advertisement or message corresponding target audience constraints. The advertising server 120 is responsible for distributing a set of advertisements and corresponding constraints to one more mobile communications devices, e.g., device 1 102, in the system 100. In addition the advertising server 120 receives information from mobile devices regarding the advertisements they transmitted and determines the appropriate compensation to be credited to the device and/or user account corresponding to the device which broadcast the advertisements. The advertising server 120 includes a processor, a set of control routines to control the operation of the server 120, and a storage element, e.g., database which may include memory for storing the advertisements, constraints, advertisement bid/price information, user account information, etc. The advertising server 120 further includes an input module which can receive input signals, and an output module for communicating signals and/or other information to other communications devices. The advertising server 120 is also responsible for tracking the advertisement transmission information, as reported by one or more communications devices in the system 100.

Figure 2:
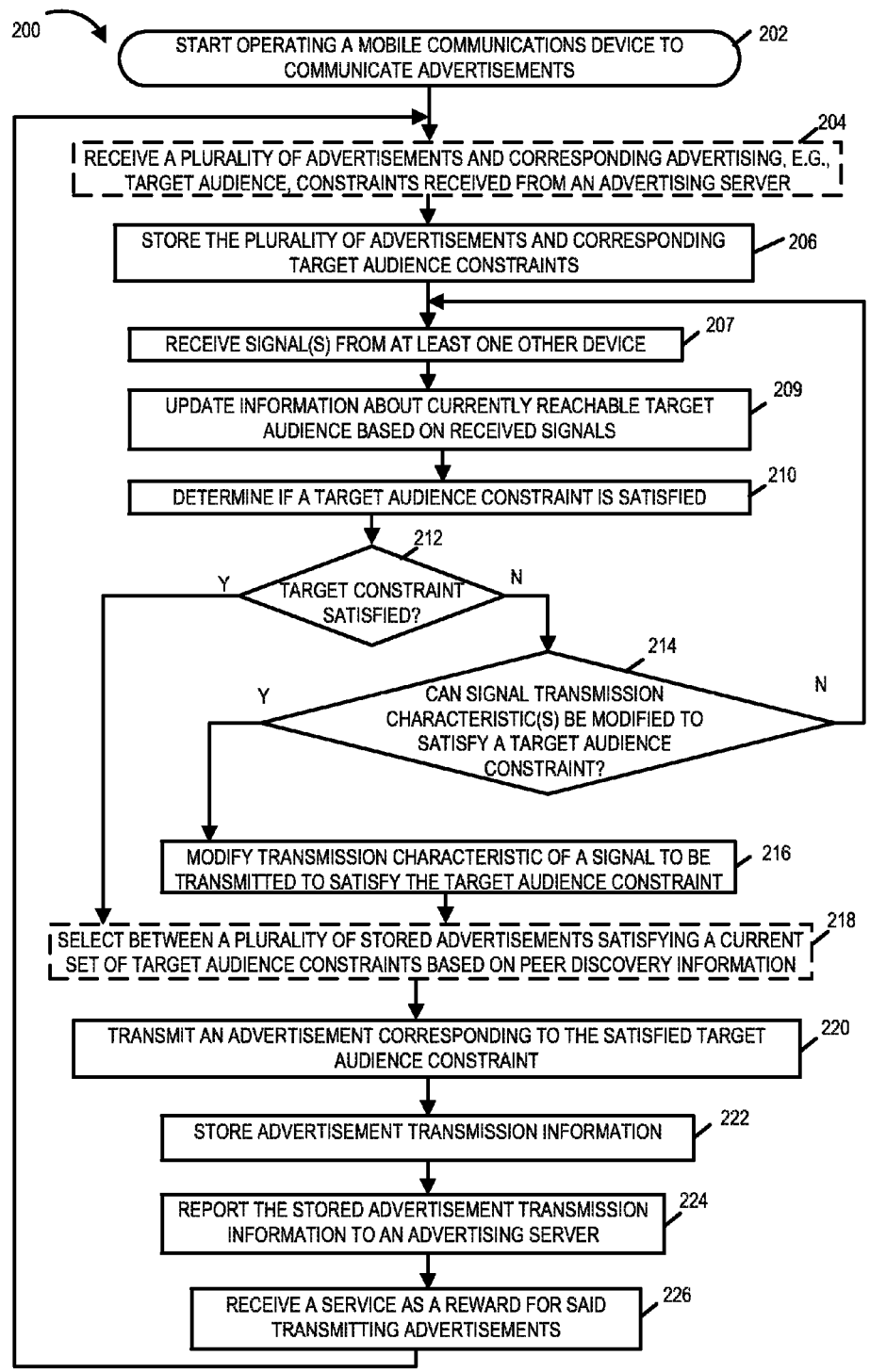
FIG. 2 is a flowchart of an exemplary method of operating a mobile communications device in accordance with an exemplary embodiment.

FIG. 2 is a flowchart 200 of an exemplary method of operating a mobile communications device, in accordance with an exemplary embodiment. The mobile communications device implementing the method of flowchart 200 maybe, e.g., any one of the wireless mobile communications devices of system 100 of FIG. 1. For the purpose of discussion of the steps shown in the exemplary method of flowchart 200 we will consider the first device to be the device 1 102. As will be discussed, in accordance with one feature of various embodiments, the mobile wireless communications device 1 102 communicates advertisements to one or more other wireless communications devices in the system 100, e.g., by transmitting one or more advertisements via a wireless signal. Operation starts in step 202, where device 102 is powered on and initialized. Operation proceeds from start step 202 to step 204.

In step 204, which is an optional step, device 1 102 receives a plurality of advertisements and corresponding advertising constraints, e.g., target audience and/or location constraints. The advertisements and constrains may be provided by advertising server 120, or some other network node configured to provide the advertisements and/or other information and may be communicated to the mobile communications device 102 either directly or via an access point such ad AP 110. The plurality of advertisements and corresponding target audience constraints may be received by the device 102 in a variety of ways. For example, the device 1 102 may periodically download advertisements and target audience constraints and/or they may be transmitted to the mobile device when the AP 110 is lightly loaded and/or the wireless communications link with the mobile device 102 is good. In some embodiments the advertisements and target audience constraints may be valid for a certain time interval.

Operation proceeds from step 204 to step 206. In step 206, device 102 stores the received plurality of advertisements and corresponding target audience constraints, e.g., in the device's memory. The advertisements include promotional and/or other marketing related information. Various advertisements have corresponding target audience constraints associated with them. In various embodiments the target audience constraints include at least one of a spatial distribution type constraint, a demographic type constraint, and a device type constraint.

Operation proceeds from step 206 to step 207 wherein device 1 102 receives a signal from at least one other communications device, e.g., signal 122. The device 1 102 may also receive signals from one or more other devices, e.g., such as signals 124, 126, 128. In some embodiments the received signals are peer discovery signals transmitted by various peer to peer devices in the system 100 to advertise discovery information. In some embodiments the peer discovery information includes a device identifier corresponding to the device transmitting the peer discovery signal. In some embodiments the peer discovery signal includes location information of the transmitting device. In various embodiments the peer discovery information indicates demographic information, e.g., gender, age, race, level of education, etc., corresponding to the user of the device transmitting the peer discovery signal. In some embodiments the peer discovery information also includes a device type identifier, identifying the type of device, e.g., an iphone device, a blackberry device, a device using GSM (Global System for Mobile Communication) technology, a device using CDMA (Code Division Multiple Access) technology, etc.

Operation proceeds from step 207 to step 209 where the device 1 102 updates stored information about a currently reachable target audience based on the received signals. In some embodiments the device 1 102 determines the spatial distribution of one or more devices from the signal strength of the received signals, e.g., peer discovery signals 122, 124, 126 etc., from the one or more devices. The received signal strength information provides an estimate of the nearness and/or relative location of the devices transmitting those signals. By aggregating such information e.g., over a period of time, the mobile communications device 1 102 can determine a number of devices which are within the transmission coverage area of device 1 102 and well within the reach, given the transmission constraints and/or transmission power limitations for the device 1 102. The device 1 102 may do so to ensure that an advertisement transmitted to one or more of devices can be recovered by the target audience. In some embodiments device 1 102 creates a list of reachable devices at a given time and then updates the list from time to time based on the additional received signals. In some embodiments the location information of the transmitting device is included in the signal(s) 122 received by device 1 102. For example in some embodiments device 1 102 determines its position and/or location, e.g., using signals transmitted by a fixed access point (or by other mobile communications devices) and indicates the location/position information in the signal 122 received by device 1 102.

In some embodiments location/position information is periodically transmitted by various devices in a separate signal which is different from the peer discovery signal. In some embodiments a location determination algorithm is used by device 1 102 to determine more precise location and/or position of the devices transmitting the peer discovery signals.

Operation proceeds from step 209 to step 210. In step 210 it is determined if an advertising, e.g., target audience, constraint is satisfied. For example, based on the received signal(s) from other devices, device 102 determines if one or more target audience constraint corresponding to the plurality of stored advertisements is satisfied. In some embodiments the target audience constraints include at least one constraint indicating a minimum number of devices corresponding to a transmission coverage area of the mobile communications device 102. Thus in some such embodiments device 102 determines if there are at least the minimum number of devices in the transmission coverage area which can be reached (e.g., using information updated in step 209). The minimum number of devices may be, e.g., a predetermined number. If the number of devices within reach is equal or greater than the minimum number of devices, then it is considered that the particular target audience constraint is satisfied, and the operation proceeds accordingly.

A number of different target audience constraints corresponding to the stored plurality of advertisements are possible. In some embodiments determining if a target audience constraint is satisfied includes checking if at least one of the stored target audience constraints, e.g., a spatial distribution type constraint, a demographic type constraint, a device type constraint, a location constraint, etc., is satisfied.

Operation proceeds from step 210 to decision step 212. If in step 212 it is determined that the target constraint is satisfied, operation proceeds from step 212 to 218 or to step 220 in the embodiments where optional step 218 is skipped. If in step 210 it is determined that a target constraint is not satisfied operation proceed to step 214.

In step 214 if it is determined that a signal transmission characteristic(s) of a signal to be transmitted, e.g., signal including advertisement and/or other information for target audience, can be modified to satisfy a target audience constraint, operation proceeds to step 216. The signal transmission characteristic(s) in some embodiments includes a transmission power level, coding rate, transmission frequency or frequency band, etc. It should be appreciated that at a given transmission power a lower coding rate transmission signal, e.g., with greater coding redundancy, can reach a larger transmission coverage area while a transmission signal with higher coding rate, e.g., with a lower level of coding redundancy, is able to reach a smaller transmission coverage area reliably. Moreover if a higher transmission power level is used to transmit a signal, it is possible to reach devices in a larger coverage area compared to signals transmitted with lower transmission power levels. Thus device 102 determines if a target constraint, for example a constraint indicating minimum number of devices to be reached in a transmission coverage area, can be satisfied by modifying one or more signal transmission characteristics, e.g., increasing transmission power and/or decreasing coding rate to reach a larger geographic area. In another example the target constraint is device type constraint, e.g., where target audience may be, e.g., iphone users. Consider that it is determined that iphone target audience is reachable however the iphone devices operate in a different frequency band than the one currently used by device 102. In such a scenario device 102 may, and sometimes does, change its signal transmission frequency to reach the desired target audience, e.g., iphone users.

Based on the determination in step 214, if it is possible to satisfy a target constraint by modifying a signal transmission characteristic operation proceeds from step 214 to step 216, otherwise operation proceeds back to step 207. In step 216 the mobile communications device 1 102 modifies a transmission characteristic of the signal to be transmitted in the manner determined to satisfy the target audience constraint which can be satisfied. The operation proceeds from step 216 to step 218.

Returning now to step 218. Step 218 is optionally performed in some embodiments. In step 218 the device 102 selects between a plurality of stored advertisements satisfying a current set of target audience constraints based on peer discovery information included in or obtained from the peer discovery signal 122. For example, in various embodiments there could be one or a plurality of advertisements corresponding to a set of target audience constraints. In some such embodiments when a plurality of advertisements are available corresponding to the satisfied target audience constraint, device 1 102 selects which one to transmit to the target devices. In some embodiments selection is based on, e.g., the amount of profit or rewards that can be earned by transmitting a selected advertisement from the set of advertisements satisfying the target audience constraints.

Operation proceeds from step 218 to step 220. In some other embodiments step 218 is skipped and operation proceeds directly from step 216 to step 220. In step 220 device 1 102 transmits an advertisement corresponding to the satisfied target audience constraint. In the embodiments where step 218 is performed, the transmitted advertisement is the selected one of the stored plurality of advertisements satisfying the target audience constraint. In various embodiments the advertisement is transmitted to the target audience, e.g., one or a plurality of devices satisfying the target audience constraints. In some embodiments the transmission of advertisements is a broadcast. In some embodiments the advertisements are transmitted individually to each target audience.

Operation proceeds from step 220 to step 222 where the device 1 102 stores advertisement transmission information, e.g., in device memory. The device information in some embodiments include number of transmissions for an advertisement, time of transmission, which one or more advertisements were transmitted, estimated size of target audience receiving the advertisements, and target audience demographic information.

Operation proceeds from step 222 to step 224. In step 224 the device 102 reports the stored advertisement transmission information to the advertising server 120. As discussed earlier, the advertising server 120 keeps track of the reported advertisement transmission information from various devices in the system 100. In some embodiments the advertising server 120 uses the reported advertisement transmission information from device 1 102 to determine a reward for the device 102 for transmitting advertisements.

Operation proceeds from step 224 to step 226 where the device 1 102 receives a service as a reward for transmitting advertisements to the target audience. The reward may be, e.g., free airtime, free text messaging service for a certain maximum number of text messages, free ringtones, a dollar amount to be reduced from the monthly bill etc. The mobile communications device 1 102 transmitting the advertisements to a target audience may be rewarded by the service provider, while the advertising charges for the transmitted advertisements are collected from the advertisers and/or promoters by the service provider, e.g., based on number of devices reached by the transmitted advertisements and the number of advertisements delivered. Operation proceeds from step 226 back to step 204.

Figure 3:
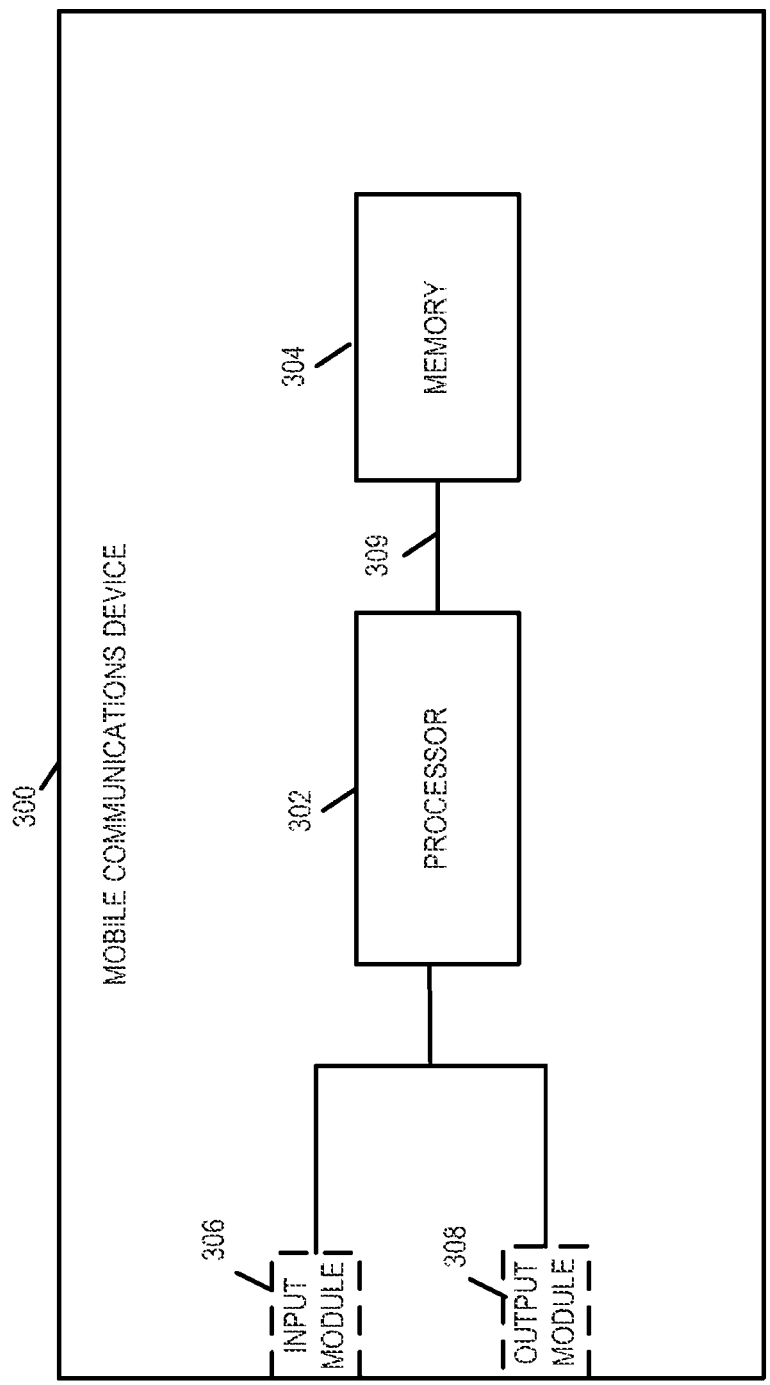
FIG. 3 is an exemplary mobile communications device in accordance with an exemplary embodiment.

FIG. 3 is a drawing of an exemplary mobile communications device 300, in accordance with an exemplary embodiment. Exemplary mobile communications device 300 may be used as any one of the wireless mobile communications devices of FIG. 1 such as device 1 102. Exemplary mobile communications device 300 may, and sometimes does, implement a method in accordance with flowchart 200 of FIG. 2.

The mobile communications device 300 includes a processor 302 and memory 304 coupled together via a bus 309 over which the various elements (302, 304) may interchange data and information. The memory 304 may include an assembly of modules used to control the mobile communications device, e.g., such as the assembly of modules shown in FIG. 4. The mobile communications device 300 further includes an input module 306 and an output module 308 which may be coupled to processor 302 as shown. However, in some embodiments, the input module 306 and output module 308 are located internal to the processor 302. Input module 306 can receive input signals. Input module 306 can, and in some embodiments does, include a wireless receiver and/or a wired or optical input interface for receiving input. Output module 308 may include, and in some embodiments does include, a wireless transmitter and/or a wired or optical output interface for transmitting output.

Processor 302 is configured to store a plurality of advertisements and corresponding target audience constraints, e.g., in memory 304; receive a signal from at least one other device; determine if a target audience constraint is satisfied; and transmit when a target audience constraint corresponding to a stored advertisement is satisfied, an advertisement corresponding to the satisfied target audience constraint. In some embodiments the processor 302 is configured to receive said plurality of advertisements and corresponding target audience constraints from an advertising server, prior to storing said plurality of advertisements and corresponding target audience constraints. In some embodiments the target audience constraints include at least one of: a spatial distribution type constraint, a demographic type constraint and device type constraint. In various embodiments the target audience constraints include at least one constraint indicating a minimum number of devices corresponding to a transmission coverage area of said mobile communications device 300.

In various embodiments, processor 302 is further configured to update information about currently reachable target audience based on the received signals. In some embodiments the processor 302 is further configured to select, between a plurality of stored advertisements satisfying a current set of constraints based on peer discovery information, e.g., included in or derived from the signal received from other mobile devices. Thus in the event when a plurality of stored advertisements satisfy a set of target audience constraints, processor 302 is configured to select at least one advertisement for transmitting, based on the peer discovery information received from other devices.

In various embodiments processor 302 is further configured to store advertisement transmission information, e.g., in the device memory 304. The stored advertisement transmission information in some embodiments include the number of transmissions, time, which advertisements were transmitted, estimated size of target audience that would receive the transmitted advertisements, audience demographic information etc. In some embodiments processor 302 is further configured to report the stored advertisement transmission information to a network server, e.g., advertising server 120. In various embodiments the processor is configured to receive a service as a reward for transmitting advertisements, when the corresponding target audience constraints are satisfied, to one or more devices in the system 100.

Figure 4:
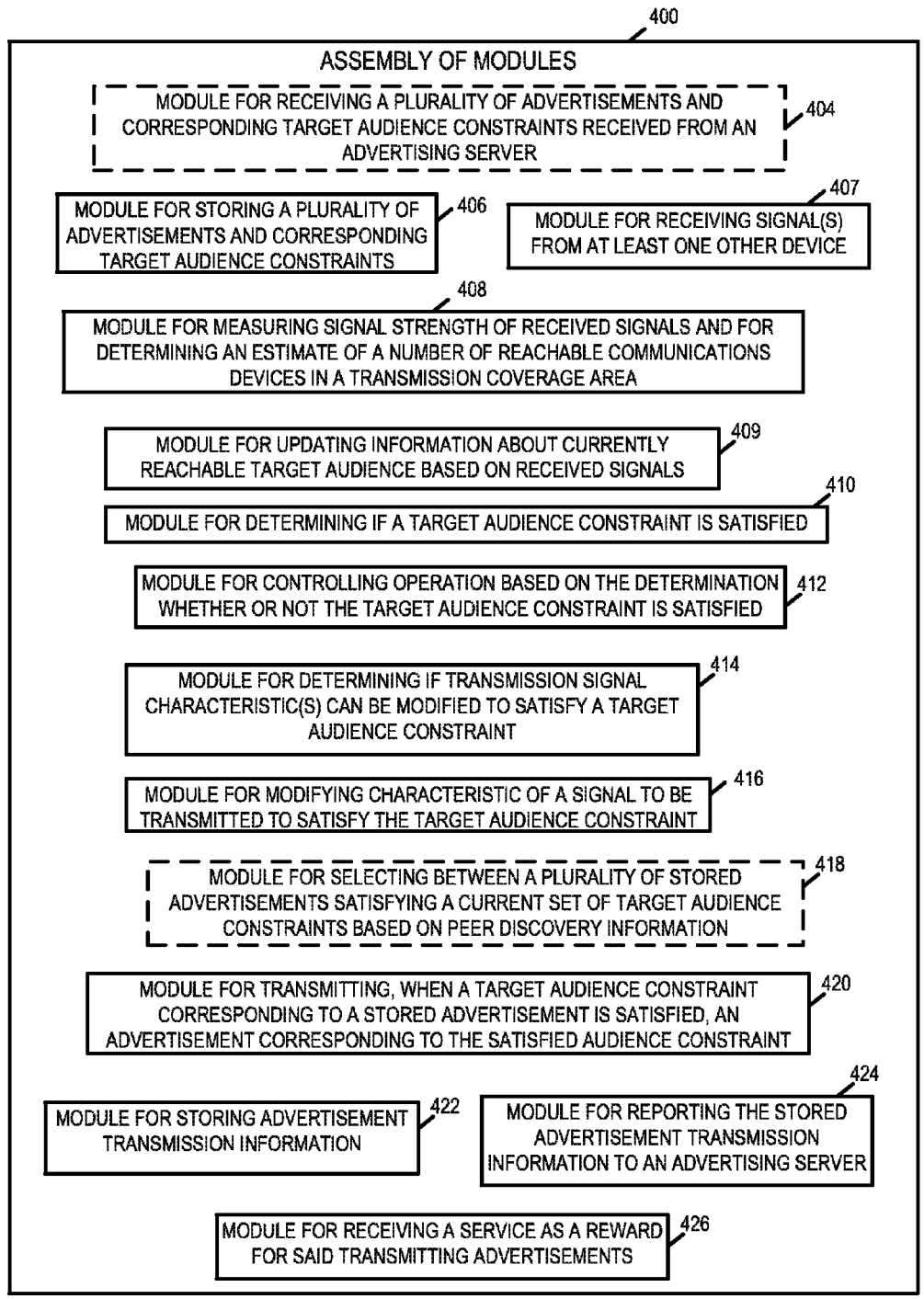
FIG. 4 is an assembly of modules which may be used in the exemplary mobile communications device of FIG. 3.

FIG. 4 illustrates an assembly of modules 400 which can, and in some embodiments is, used in the mobile communications device 300 illustrated in FIG. 3. The modules in the assembly 400 can be implemented in hardware within the processor 302 of FIG. 3, e.g., as individual circuits. Alternatively, the modules may be implemented in software and stored in the memory 304 of the mobile communications device 300 shown in FIG. 3. While shown in the FIG. 3 embodiment as a single processor, e.g., computer, it should be appreciated that the processor 302 may be implemented as one or more processors, e.g., computers. When implemented in software the modules include code, which when executed by the processor, configure the processor, e.g., computer, 302 to implement the function corresponding to the module. In some embodiments, processor 302 is configured to implement each of the modules of the assembly of modules 400. In embodiments where the assembly of modules 400 is stored in the memory 304, the memory 304 is a computer program product comprising a computer readable medium comprising code, e.g., individual code for each module, for causing at least one computer, e.g., processor 302, to implement the functions to which the modules correspond.

Figure 5:
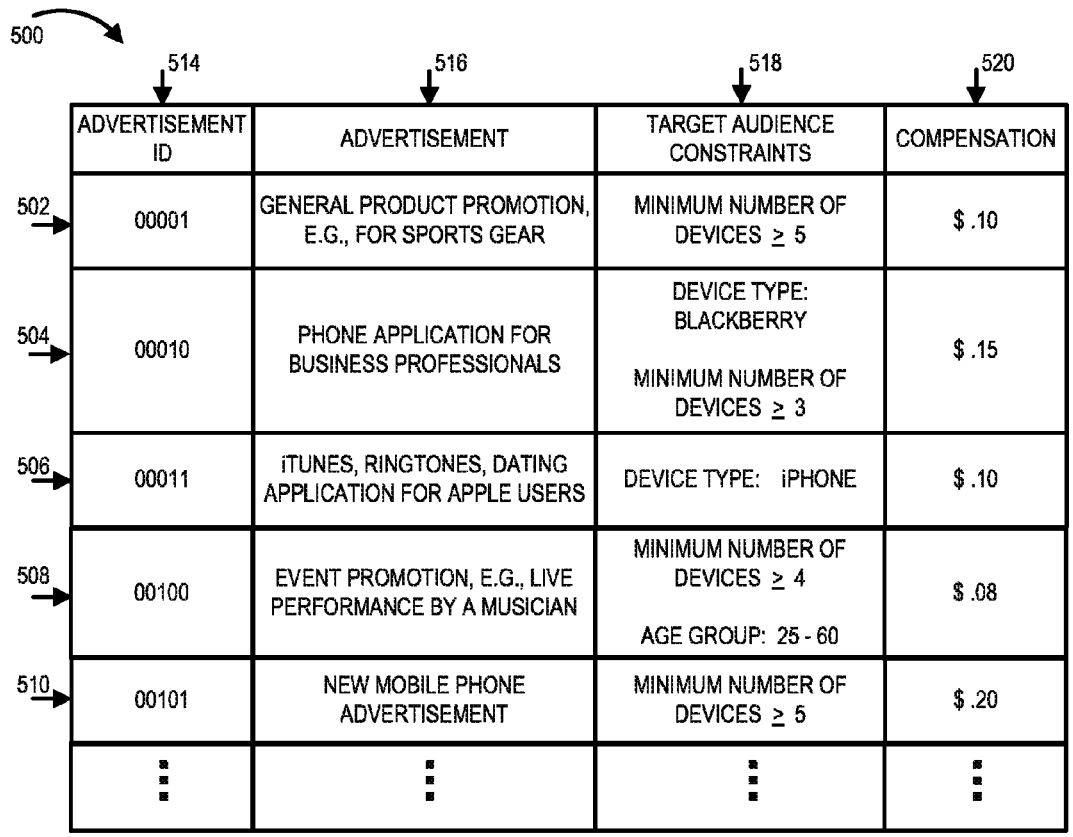
FIG. 5 illustrates an exemplary table including information regarding a plurality of advertisements and corresponding target audience constraints.

Completely hardware based or completely software based modules may be used. However, it should be appreciated that any combination of software and hardware (e.g., circuit implemented) modules may be used to implement the functions. As should be appreciated, the modules illustrated in FIG. 4 control and/or configure the wireless terminal 300 or elements therein such as the processor 302, to perform the functions of the corresponding steps illustrated and/or described in the method of flowchart 200 of FIG. 2. The memory 304 includes information used to implement the method, e.g., advertisements to be broadcast and related information including information on the advertisements which were broadcast as well as the value or reward to be provided for an advertisement satisfying a transmission constraint. In some embodiments information, e.g., the information shown in FIG. 5, is stored in the memory.

The assembly of modules 400 includes a module corresponding to each step of the method of flowchart 200 shown in FIG. 2. The module in FIG. 4 which performs or controls the processor 302 to perform a corresponding step shown in flowchart 200 is identified with a number beginning with 4 instead of beginning with 2. For example module 404 corresponds to step 204 and is responsible for performing the operation described with regard to step 204. The assembly of modules 400 includes an optional module 404 for receiving a plurality of advertisements and corresponding target audience constraints from an advertising server, a module 406 for storing the plurality of advertisements and corresponding target audience constraints, a module 407 for receiving signal(s) from at least one other device, a module 408 for measuring signal strength of received signals and for determining an estimate of a number of reachable communications devices in a transmission coverage area, and a module 409 for updating information about currently reachable target audience based on the received signal(s).

The assembly of modules 400 further includes a module 410 for determining if a target audience constraint is satisfied. In various embodiments the module 410 makes the determination based on the received signal from the at least one other device. In various embodiments the determination module 410 uses the peer discovery information and/or other information obtained or derived from the signals received from one or more other devices, and the stored target audience constraints to make the determination whether or not a target audience constraint is satisfied.

In some embodiments the target audience constraints include at least one of: a spatial distribution type constraint, a demographic type constraint and device type constraint. In some embodiments the target audience constraints include at least one constraint indicating a minimum number of devices corresponding to a transmission coverage area of said mobile communications device. The assembly of modules 400 further includes a module 412 controlling the operation of the mobile communications device 300 based on the determination whether or not the target audience constraint is satisfied, a module 414 for determining if signal transmission characteristic(s) can be modified to satisfy a target audience constraint, and a module 416 for modifying characteristic(s) of a signal to be transmitted to satisfy the target audience constraint.

The assembly of modules 400 further includes a module 418 for selecting between a plurality of stored advertisements satisfying a current set of target audience constraints based on peer discovery information, a module 420 for transmitting, when a target audience constraint corresponding to a stored advertisement is satisfied, an advertisement corresponding to the satisfied target audience constraint, a module 422 for storing advertisement transmission information, a module 424 for reporting the stored advertisement transmission information to an advertising server, and a module 426 for receiving a service as a reward for transmitting advertisements. In some embodiments the advertisement transmission information includes number of transmissions, time, which advertisements were transmitted, estimated size of audience, audience demographic information etc.

The modules shown in dashed line boxes, e.g., modules 404, 418, are optional, and thus one or more of these modules may be present in some embodiments while not in others. The dashed boxes indicate that although these modules are included in the assembly of modules 400 in various embodiments, the processor 302 may execute such an optional module in embodiments where the step to which these modules correspond, is performed.

FIG. 5 illustrates an exemplary table 500 including information regarding a plurality of advertisements and corresponding target audience constraints. The plurality of advertisements and corresponding target audience constraints information in various embodiments is received from an advertising server such as server 120. The information included in table 500 is, e.g., stored in memory 304 of mobile communications device 300 and used to implement a method, e.g., in accordance with flowchart 200 of FIG. 2. In accordance with one aspect, the mobile communications device 300 transmits one or more advertisements to target audience device(s) when target audience constraints corresponding to the one or more advertisements are satisfied.

As shown, each individual entry in column 514 includes an advertisement ID corresponding to a stored advertisement. Each individual entry in column 516 includes advertisement information corresponding to the advertisement identified by the advertisement ID in the corresponding row, and each entry in column 518 includes target audience constraint corresponding to the advertisement identified by the advertisement ID in the corresponding row. Each individual entry in column 520 includes information regarding a reward or compensation that the transmitting device, such as mobile device 300 in this example, will receive for transmitting the corresponding advertisement identified by the advertisement ID in the corresponding row, when the corresponding target audience constraint is satisfied. For example, row 502 includes information corresponding to an advertisement identified by ID 00001, which is a general product promotion, e.g., for sports gear such as jogging shoes. The corresponding advertising, e.g., target audience, constraint to be satisfied before the advertisement 00001 could be transmitted, which may be set by the advertiser/promoter, is that a minimum of 5 devices or more (e.g., potential viewers who will receive the advertisement) should be able to receive the advertisement reliably, e.g., should be within the transmission coverage area of the transmitting mobile communications device 300. The first entry in column 520 corresponding to advertisement 00001 indicates that the mobile communications device 300 will be rewarded, e.g., 0.10 dollars, for transmitting the advertisement when the corresponding target audience constraint is satisfied. In this example and for the particular case of advertisement 00001, only a single advertising constraint or the target audience constraint is set by the advertiser/promoter, however as will be discussed later in the example the advertiser/promoter may, and sometimes does, set a plurality of target audience constraints to be satisfied before an advertisement can be transmitted by the transmitting mobile communications device 300.

Row 504 includes information corresponding to an advertisement identified by ID 00010, which is a promotion for a new phone application for business executives and/or working professionals. The corresponding target audience constraints to be satisfied include device type constraint and a minimum device number constraint. For example the device type constraint specifies that the particular advertisement can be transmitted to, e.g., blackberry device users, and the minimum device number constraint specifies that a minimum of 3 devices or more should be able to receive the advertisement reliably. In some embodiments when both of the target audience constraints are satisfied the mobile communication device 300 transmits the corresponding advertisement to the target audience. In some embodiments the advertisers/promoters set the target audience constraints so that the advertisements are transmitted to a set of device users who are more likely to buy the advertised product, e.g., based on data regarding historical buying habits of various users, nature of work or profession, etc.

Row 506 includes information corresponding to an advertisement identified by ID 00011, which is a promotion for iTunes, ringtones and dating application for apple phone users. The corresponding target audience constraints to be satisfied include the device type constraint. The device type constraint specifies that the particular advertisement is to be transmitted to, e.g., iphone users. Row 508 includes information corresponding to an advertisement identified by ID 00100, which is an event promotion advertisement, e.g., for a live performance by a musician. The corresponding target audience constraints to be satisfied include minimum device number constraint and a demographic constraint. The minimum number of reachable devices should be greater than or equal to 4, and the demographic constraint specifies that receiving device users should be in the age group of 25-60 years.

Row 510 includes information corresponding to an advertisement identified by ID 00101, which is a promotion for a new mobile phone. The corresponding target audience constraint to be satisfied specifies that the minimum number of reachable devices should be greater than or equal to 5. Thus the mobile communications device 300 may use the information included in table 500 to transmit one or more advertisements in accordance with the method of flowchart 200.

Figure 6:
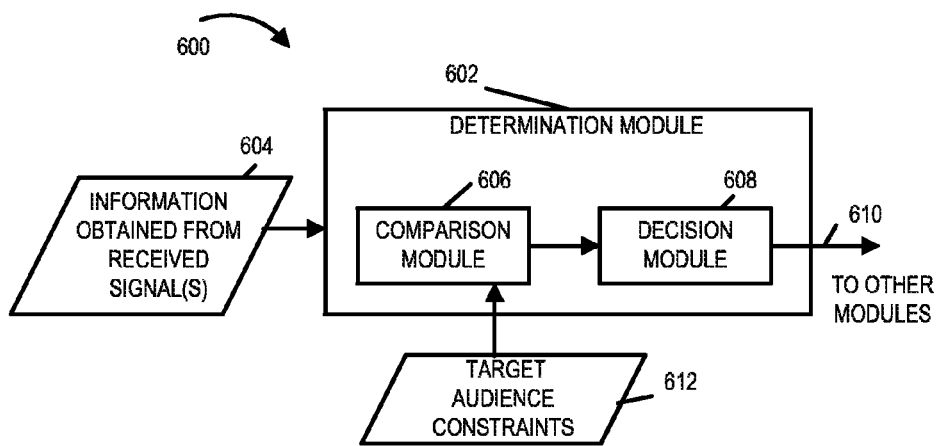
FIG. 6 illustrates an example which shows an exemplary process of determining whether a target audience constraint corresponding to a stored advertisement is satisfied, in accordance with one embodiment.

FIG. 6 illustrates an example 600 showing operation of an exemplary determination module 602 included in a mobile communications device, e.g., device 102, in accordance with an exemplary embodiment. Determination module 602 includes a comparison module 606 and a decision module 608. The determination module 602 is used for determining whether or not a target audience constraint corresponding to a stored advertisement is satisfied, e.g., based on the received signal(s) from at least one other device. As illustrated in the example, in some embodiments the determination module 602 receives information 604 obtained or derived from received signals from one or more devices. In some embodiments the information includes device type identifier information, demographic information corresponding to the user of a device from which signal is received, device location and/or position information (which may be either derived using the received signal strength at device 1 102 and other information, or may be expressly indicated in the received signal). As discussed earlier, from the derived signal strength information (corresponding to one or more signals received by device 1 102 from other devices) the device 1 102 can also estimate the number of devices within its transmission coverage area.

The comparison module 606 uses the stored target audience constraints information 612 corresponding to a plurality of advertisements, and the information 604 obtained or derived from the received signal(s) to determine whether a target audience constraint is satisfied. The result of the determination is provided to the decision module 608 which decides what action the communications device should take, based on the result of determination. In some embodiments when the determination result shows that the target constraint is satisfied the decision module 608 generates an instruction controlling the mobile communications device 102 to transmit an advertisement corresponding to the satisfied target audience constraint. In some embodiments when the determination result shows that the no target constraint is satisfied, the decision module 608 generates an instruction controlling the mobile communications device 1 102 to refrain from transmitting an advertisement. In some embodiments when the determination shows that a target constraint is not satisfied, the decision module triggers additional processing to be performed by other device modules, e.g., to determine if a signal transmission characteristic can be modified to satisfy a target audience constraint.

In various embodiments a mobile communications device, e.g., communications device 300 of FIG. 3, includes a module corresponding to each of the individual steps and/or operations described with regard to any of the Figures in the present application and/or described in the detailed description of the present applications. The modules may, and sometimes are implemented in hardware. In other embodiments, the modules may, and sometimes are, implemented as software modules including processor executable instructions which when executed by the processor of the communications device cause the device to implement the corresponding step or operation. In still other embodiments, some or all of the modules are implemented as a combination of hardware and software.

In some embodiments information regarding the number and distribution of mobile devices in the geographic vicinity of the mobile device which may transmit an advertisement is determined by the device which may transmit the advertisement. In various embodiments such information is determined from peer discovery signals and/or device location information. In addition to number and/or distribution of devices, demographic information about the users of the device and/or device type information may be taken into consideration. This information is used in determining whether target audience constraints corresponding to stored advertisements are satisfied. In various embodiments when target audience constraint(s) corresponding to a stored advertisement is satisfied, the mobile device transmits the corresponding advertisement to the target audience.

In some embodiments when one or more target audience constraints are not satisfied, a determination is made to find if one or more transmission characteristics can be modified to satisfy a target audience constraint. If a target audience constraint is satisfied after modification of the one or more transmission characteristics, the advertisement corresponding to the satisfied constraint is transmitted to the target audience.

In some embodiments the broadcast transmission area vs the number of advertisements which can be broadcast in a given time period is dynamically adjusted as a function of the number and distribution of mobile devices in an area, e.g., the area surrounding the mobile device which may transmit the advertisement. In this way, advertisement revenue can be optimized by maximizing the amount of ad revenue generated based on the combination of the number of devices which can be reached by the advertisement transmissions and the total number of advertisements which are broadcast in a given period of time. In some embodiments the tradeoff between the number of advertisements delivered and the potential customers reached further takes into consideration customer demographics. For example, it may be more valuable to reach fewer iphone users with more advertisements, e.g., iphone user targeted advertisements, than to reach a larger audience with less advertisements (but little or no increase in the number of iphone users in the larger audience).

In some embodiments, physical limitations impose a natural cost for broadcasting any given message. However, the value of the broadcast message is often proportional to the number of potential customers that the message reaches. The price for broadcasting from a broadcast station may, and in some embodiments is determined by a bidding process with advertises specifying a price they will pay is an advertisement satisfies a particular constraint. This information may, and in some embodiments is, communicated to the mobile wireless communications terminals and stored along with the advertisements and corresponding constraints. The mobile device and use the information relating to the amount of compensation for satisfying an advertisement in determining which advertisements to transmit in order to maximize revenue and/or what transmission characteristics should be modified so that the transmission constraints corresponding to the highest bids will be satisfied. Thus the mobile device can maximize the revenue obtained from transmitting advertisements.

In some embodiments, the system may include a central network device and the broadcast stations may be Wide Area Network (WAN) devices, Wireless Local Area Network (WLAN) devices and/or other types of mobile communications devices including various type of peer to peer devices. In various embodiments, the mobiles are devices that autonomously transmit peer discovery signals that are detected by access points and/or other mobile devices. Spatial distribution of users may and in some embodiments is obtained by a mobile or other network device by aggregating information about the number of received peer discovery signals and the signal strength of received peer discovery signals. In some embodiments the mobiles themselves determine their position from Global Positioning Signals (GPS) and/or by detecting signals transmitted by access points or other mobiles. The determined position may be used to decide whether an advertising transmission constraint in the form of a location constraint is satisfied.

In some embodiments, the information used to determine whether a target audience constraint corresponding to an advertisement to be transmitted is satisfied, may involve the spatial distribution of the mobiles and/or demographic information relating to the users of those mobiles. This information may be decoded from the peer discovery signals transmitted by the mobiles and/or known or determined based on the type of device indicated by the peer discovery signals. For example, information may be stored in the mobile device associating a particular group of users with a particular device. This information may be used in determining if a demographic advertising constraint is satisfied given a set of received peer discovery signals indicative of particular devices in a region.

The techniques of various embodiments may be implemented using software, hardware and/or a combination of software and hardware. Various embodiments are directed to apparatus, e.g., mobile nodes such as mobile terminals, base stations, communications system. Various embodiments are also directed to methods, e.g., method of controlling and/or operating mobile nodes, base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, signal receiving, processing, and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications node, including a processor configured to implement one, multiple or all of the steps of one or more methods of the invention.

In some embodiments, the processor or processors, e.g., CPUs, of one or more devices, e.g., communications nodes such as access nodes and/or wireless terminals, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node, with a processor which includes a module corresponding to each of the steps of the various described methods performed by the device in which the processor is included. In some but not all embodiments a device, e.g., communications node, includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between communications devices. In some embodiments one or more communications devices are implemented as access points which establish communications links with mobile nodes using OFDM and/or CDMA and/or may provide connectivity to the internet or another network via a wired or wireless communications link. In various embodiments the mobile nodes are implemented as notebook computers, personal data assistants (PDAs), or other portable devices including receiver/transmitter circuits and logic and/or routines, for implementing the methods.

What is claimed is:

1. A method of operating a first mobile communications device to communicate advertisements, the method comprising:

storing a plurality of advertisements and corresponding target audience constraints in said first mobile communications device;

receiving a signal from a second mobile communications device;

updating information, stored in said first mobile communications device, about a currently reachable target audience based on information included in the received signal;

determining, in said first mobile communications device, based on the updated information about a currently reachable target audience, if a target audience constraint corresponding to one of said plurality of advertisements is satisfied, said target audience constraint being one of a device type constraint, a minimum number of devices in a transmission coverage area constraint, a gender constraint or an age constraint; and transmitting, from the first mobile communication device, when it is determined that a target audience constraint corresponding to said one of said plurality of advertisements is satisfied, said one of said plurality of advertisements.

2. The method of claim 1,
wherein said received signal from the second mobile communications device is a peer discovery signal transmitted by said second mobile communications device.

3. The method of claim 1, further comprising:
modifying, when it is determined that a target audience constraint corresponding to said one of said plurality of advertisements is not satisfied, a transmission characteristic of a signal to be transmitted to satisfy the target audience constraint, said transmission characteristic being one of a transmission power level, coding rate, or transmission frequency.

4. The method of claim 1, further comprising:
selecting, between a plurality of stored advertisements satisfying a current set of target audience constraints based on peer discovery information.

5. The method of claim 4, further comprising:
storing, in said first mobile communications device, advertisement transmission information after transmitting said one of said plurality of advertisements, said advertisement transmission information for said one of said plurality of advertisements including: a number of transmissions, time of transmission, estimated size of target audience receiving said one of said plurality of advertisements, and target audience demographic information.

6. The method of claim 5, further comprising:
receiving said stored plurality of advertisements and corresponding target audience constraints from an advertising server; and
reporting said stored advertisement transmission information to an advertising server.

7. The method of claim 6, further comprising:
receiving a service as a reward for said transmitting advertisements.

8. The method of claim 1, wherein said signal from the second communications device included a device type identifier indicating the second mobile communications device is of a first type; and
wherein updating information about a current reachable target audience based on the received signal includes modifying information in said first communications device indicating the number of communications devices of the first type which can be reached by a transmission from said first communications device.

9. A first mobile communications device comprising:
means for storing a plurality of advertisements and corresponding target audience constraints in said mobile communications device;
means for receiving a signal from a second mobile communications device;
means for updating information, stored in said first mobile communications device, about a currently reachable target audience based on information included in the received signal;
means for determining, based on the updated information about a currently reachable target audience, if a target audience constraint corresponding to one of said plurality of advertisements is satisfied, said target audience constraint being one of a device type constraint, a minimum number of devices in a transmission coverage area constraint, a gender constraint or an age constraint; and
means for transmitting, when it is determined that a target audience constraint corresponding to said one of said plurality of advertisements is satisfied, said one of said plurality of advertisements.

10. The first mobile communications device of claim 9,
wherein said received signal is a peer discovery signal transmitted by said second mobile communications device.

11. The first mobile communications device of claim 9, further comprising:
means for modifying a transmission characteristic of a signal to be transmitted to satisfy the target audience constraint, when it is determined that a target audience constraint corresponding to said one of said plurality of advertisements is not satisfied said transmission characteristic being one of a transmission power level, coding rate, or transmission frequency.

12. The first mobile communications device of claim 9, further comprising:
means for selecting, between a plurality of stored advertisements satisfying a current set of target audience constraints based on peer discovery information.

13. The first mobile communications device of claim 12, further comprising:
means for storing advertisement transmission information after said one of said plurality of advertisements is transmitted, said advertisement transmission information for said one of said plurality of advertisements including: a number of transmissions, time of transmission, estimated size of target audience receiving said one of said plurality of advertisements, and target audience demographic information.

14. The first mobile communications device of claim 13, further comprising:
means for receiving said stored plurality of advertisements and corresponding target audience constraints from an advertising server; and
means for reporting said stored advertisement transmission information to an advertising server.

15. A first mobile communications device comprising:
at least one processor configured to:
store a plurality of advertisements and corresponding target audience constraints in said first mobile communications device;
receive a signal from a second mobile communications device;
update information about a currently reachable target audience, stored in said first mobile communications device, based on information included in the received signal;
determine, based on the updated information about a currently reachable target audience, if a target audience constraint corresponding to one of said plurality of advertisements is satisfied, said target audience constraint being one of a device type constraint, a minimum number of devices in a transmission coverage area constraint, a gender constraint or an age constraint; and
transmit from the first mobile communication device, when it is determined that a target audience constraint corresponding to said one of said plurality of advertisements is satisfied, said one of said plurality of advertisements; and
memory coupled to said at least one processor.

16. The first mobile communications device of claim 15, wherein said received signal is a peer discovery signal transmitted by said second mobile communications device.

17. The first mobile communications device of claim 15, wherein said at least processor is further configured to:
   select, between a plurality of stored advertisements satisfying a current set of target audience constraints based on peer discovery information.

18. The first mobile communications device of claim 17, wherein said at least processor is further configured to:
   store, in said first mobile communications device, advertisement transmission information after transmitting said one of said plurality of advertisements, said advertisement transmission information for said one of said plurality of advertisements including: a number of transmissions, time of transmission, estimated size of target audience receiving said one of said plurality of advertisements, and target audience demographic information.

19. The first mobile communications device of claim 18, wherein said at least processor is further configured to:
   receive said stored plurality of advertisements and corresponding target audience constraints from an advertising server; and
   report said stored advertisement transmission information to an advertising server.

20. A computer program product for use in a first mobile communications device, comprising: non-transitory computer readable medium comprising:
   code for causing at least one computer to store a plurality of advertisements and corresponding target audience constraints in said first mobile communications device;
   code for causing said at least one computer to receive a signal from a second mobile communications device;
   code for causing said at least one computer to update information about a currently reachable target audience, stored in said first mobile communications device, based on the information included in received signal;
   code for causing said at least one computer to determine, based on the updated information about a currently reachable target audience, if a target audience constraint corresponding to one of said plurality of advertisements is satisfied, said target audience constraint being one of a device type constraint, a minimum number of devices in a transmission coverage area constraint, a gender constraint or an age constraint; and
   code for causing said at least one computer to transmit from the first mobile communication device, when it is determined that a target audience constraint corresponding to said one of said plurality of advertisements is satisfied, said one of said plurality of advertisements.

* * * * *